Figure 3:
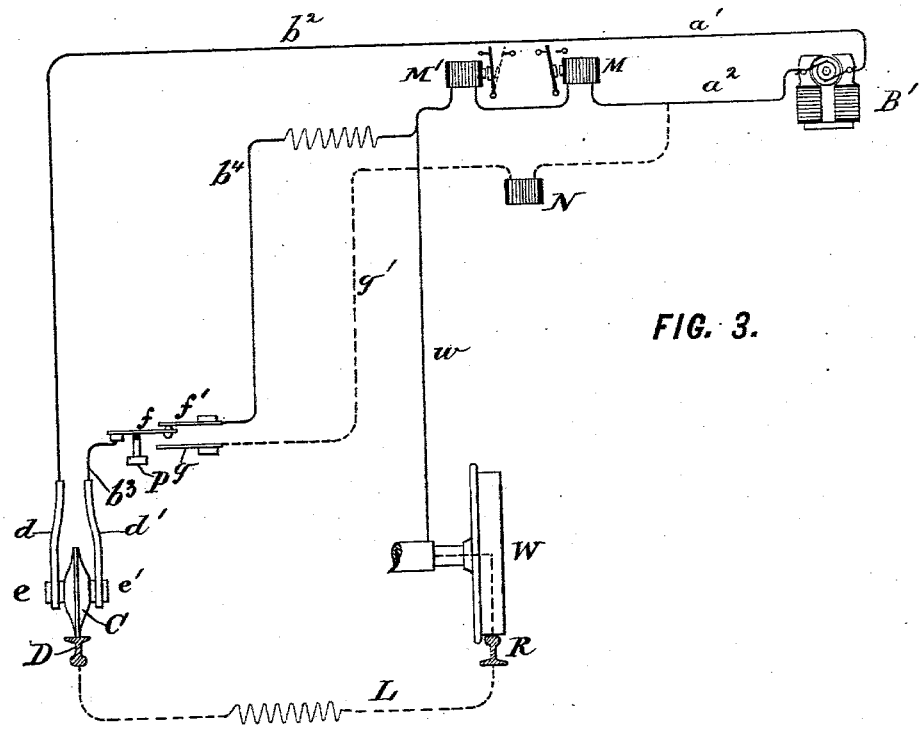

No. 716,871.  
Patented Dec. 30, 1902.
E. B. CUTTEN & A. C. FRASER.
LOCOMOTIVE CAB ELECTRIC RAILWAY SIGNAL.
(Application filed June 22, 1891.)
(No Model.)  
7 Sheets—Sheet 1.
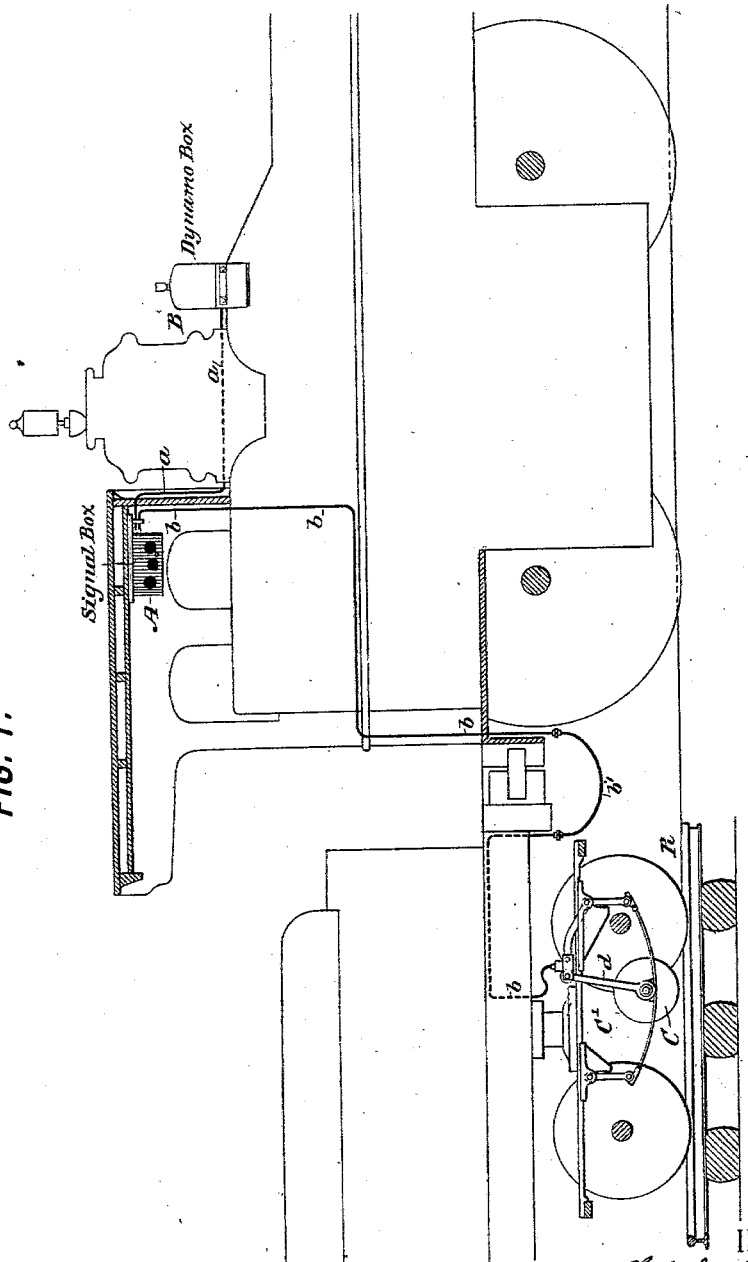
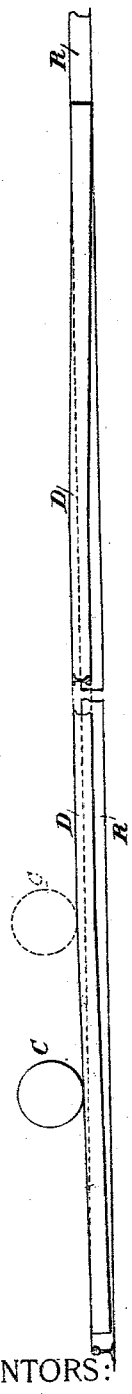
WITNESSES:  
Geo. W. Breck  
C. E. Ashley
INVENTORS:  
Elisha B. Cutten and  
Arthur C. Fraser.  
By their Attorneys,  
Arthur C. Fraser and Co No. 716,871. Patented Dec. 30, 1902.
E. B. CUTTEN & A. C. FRASER.
LOCOMOTIVE CAB ELECTRIC RAILWAY SIGNAL.
(Application filed June 22, 1891.)

(No Model.) 7 Sheets—Sheet 2.

WITNESSES:
John Beeker
Fred White

INVENTORS:
Elisha B. Cutten and
Arthur C. Fraser,
By their Attorneys,
Arthur C. Fraser and Co.

No. 716,871. Patented Dec. 30, 1902.
E. B. CUTTEN & A. C. FRASER.
LOCOMOTIVE CAB ELECTRIC RAILWAY SIGNAL.
(Application filed June 22, 1891.)

(No Model.) 7 Sheets—Sheet 3.

WITNESSES:
Geo. W. Breck
C. E. Ashley

INVENTORS:
Elisha B. Cutten and
Arthur C. Fraser,
By their Attorneys,

No. 716,871. Patented Dec. 30, 1902.
E. B. CUTTEN & A. C. FRASER.
LOCOMOTIVE CAB ELECTRIC RAILWAY SIGNAL.
(Application filed June 22, 1891.)
(No Model.) 7 Sheets—Sheet 4.

WITNESSES:
Geo. W. Breck.
C. E. Ashley.

INVENTORS:
Elisha B. Cutten and
Arthur C. Fraser,
By their Attorneys,
Arthur C. Fraser and Co.

No. 716,871. Patented Dec. 30, 1902.
E. B. CUTTEN & A. C. FRASER.
LOCOMOTIVE CAB ELECTRIC RAILWAY SIGNAL.
(Application filed June 22, 1891.)
(No Model.) 7 Sheets—Sheet 5.
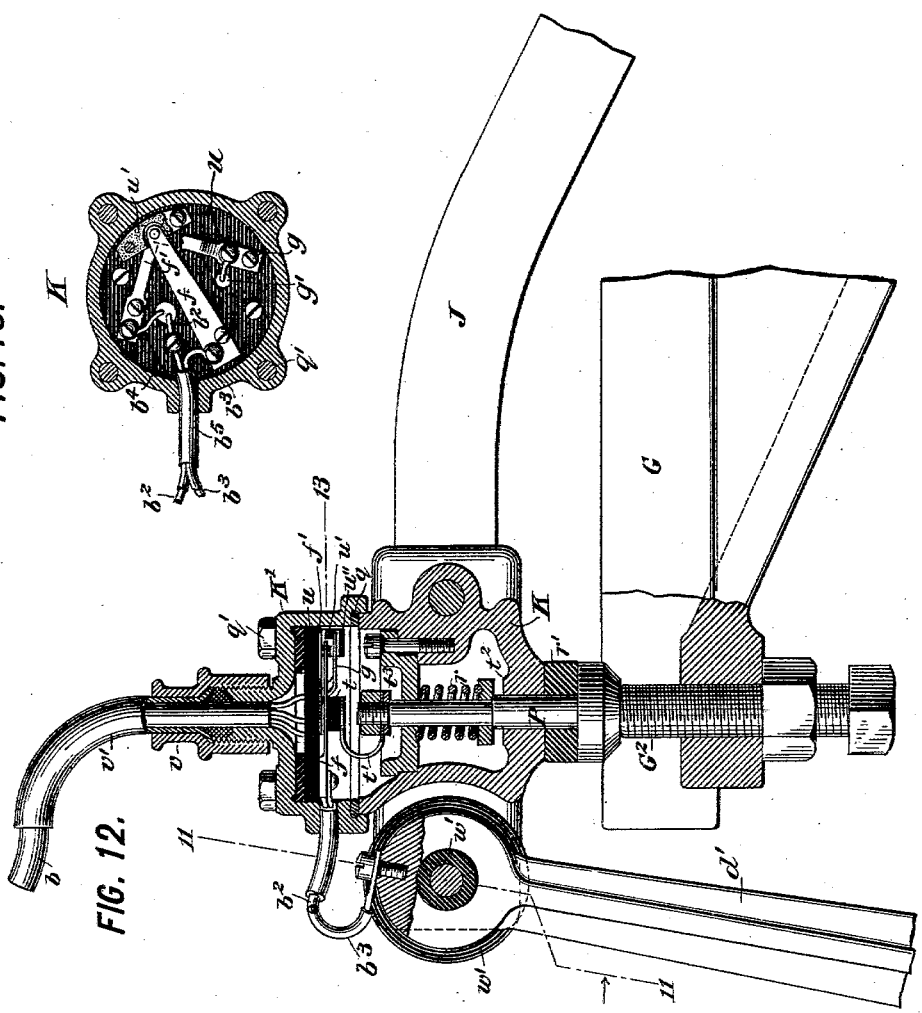
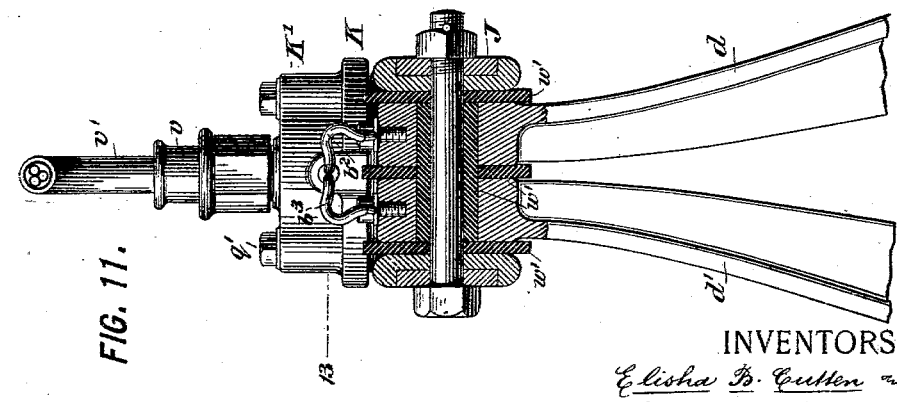
WITNESSES:
Geo. W. Breck.
C. E. Ashley
INVENTORS:
Elisha B. Cutten and
Arthur C. Fraser,
By their Attorneys, No. 716,871. Patented Dec. 30, 1902.
E. B. CUTTEN & A. C. FRASER.
LOCOMOTIVE CAB ELECTRIC RAILWAY SIGNAL.
(Application filed June 22, 1891.)
(No Model.) 7 Sheets—Sheet 6.
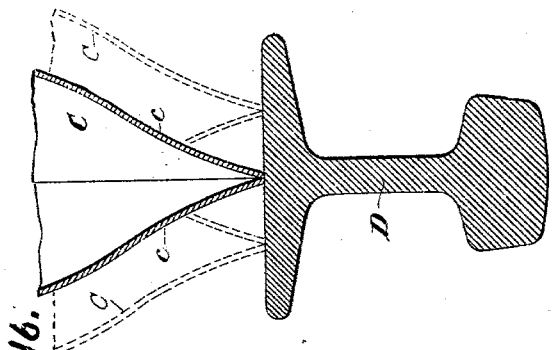
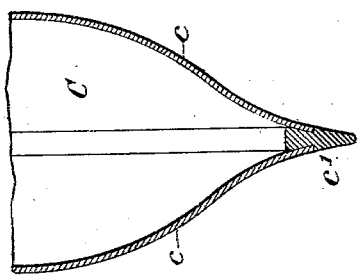
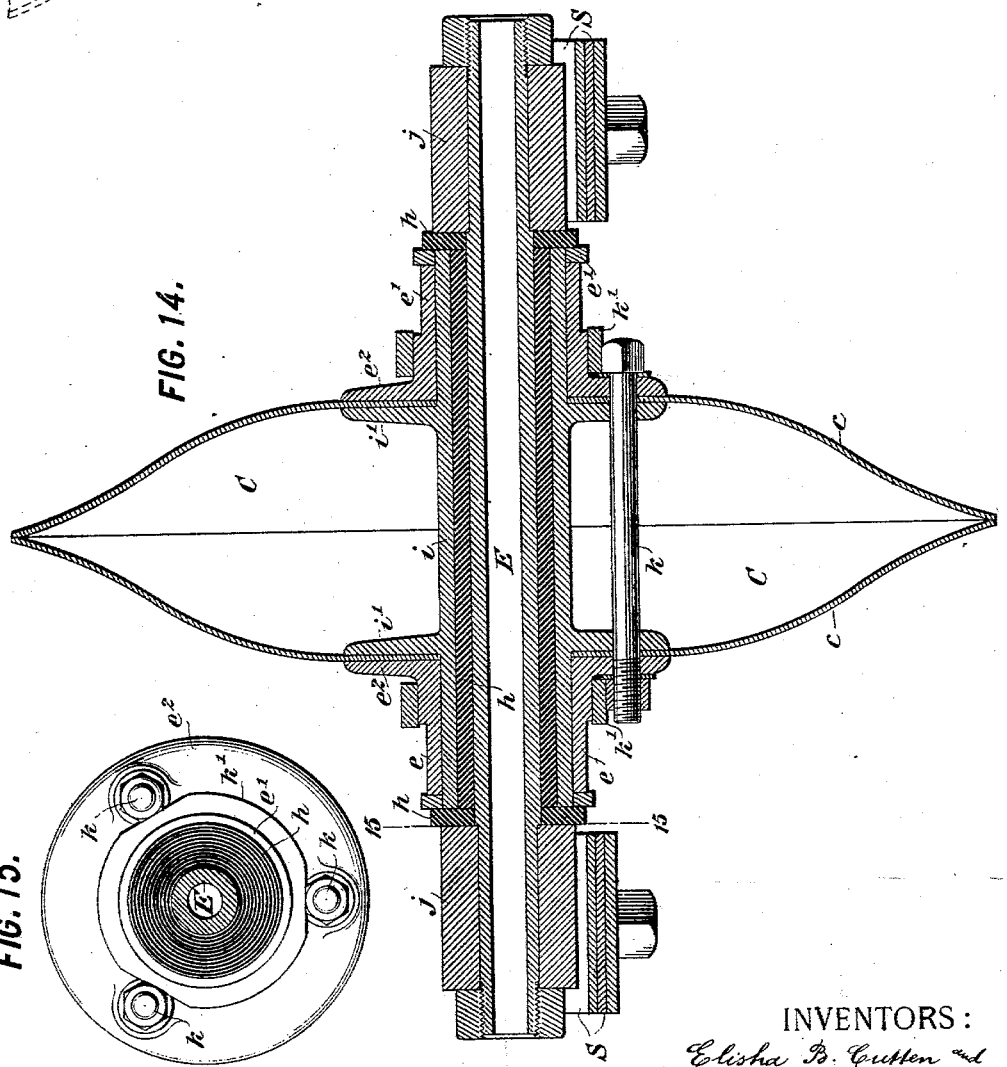
WITNESSES:
Geo. W. Breck.
C. E. Ashley.
INVENTORS:
Elisha B. Cutten and
Arthur C. Fraser,
By their Attorneys,
Arthur C. Fraser and Leo.

No. 716,871.
Patented Dec. 30, 1902.
E. B. CUTTEN & A. C. FRASER.
LOCOMOTIVE CAB ELECTRIC RAILWAY SIGNAL.
(Application filed June 22, 1891.)
(No Model.)
7 Sheets—Sheet 7.
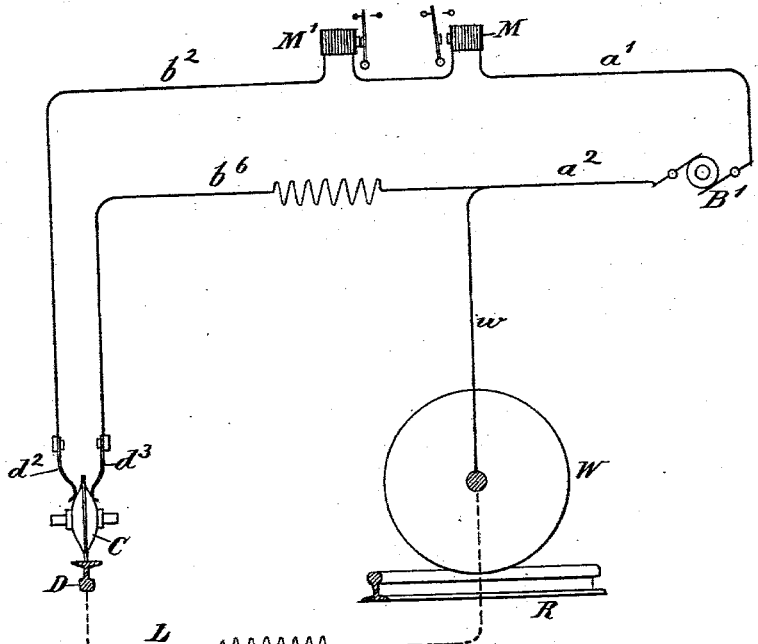
FIG. 18.
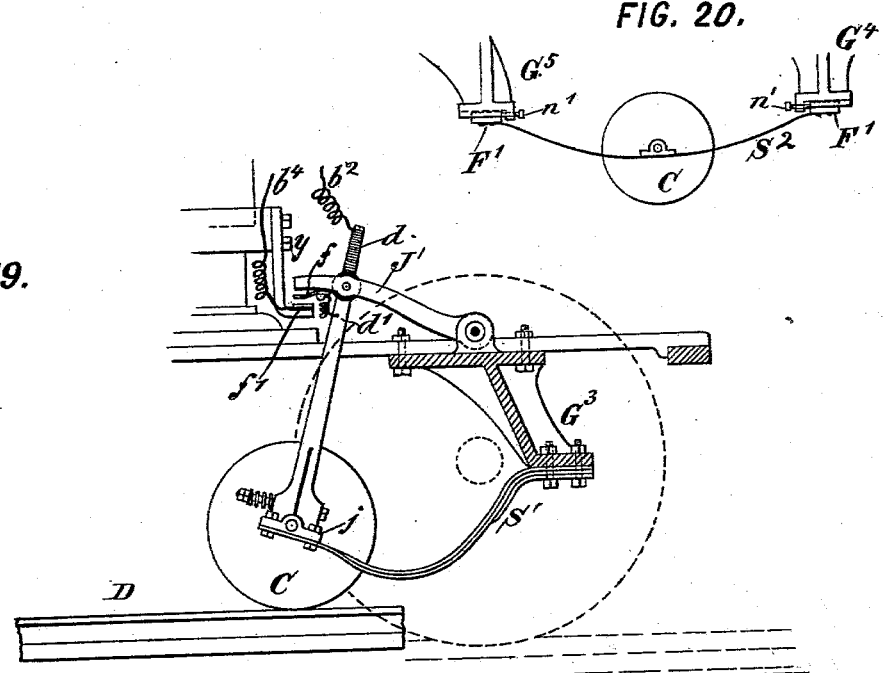
FIG. 19.
FIG. 20.
WITNESSES:
John Becker
Fred White
INVENTORS:
Elisha B. Cutten and
Arthur C. Fraser,
By their Attorneys,

UNITED STATES PATENT OFFICE.

ELISHA B. CUTTEN, OF NEW YORK, N. Y., AND ARTHUR C. FRASER, OF BROOKLYN, NEW YORK, ASSIGNORS TO SAID FRASER AND GEORGE H. FRASER, OF BROOKLYN, NEW YORK.

LOCOMOTIVE-CAB ELECTRIC RAILWAY-SIGNAL.

SPECIFICATION forming part of Letters Patent No. 716,871, dated December 30, 1902.

Application filed June 22, 1891. Serial No. 397,106. (No model.)

*To all whom it may concern:*

Be it known that we, ELISHA B. CUTTEN, residing in the city and county of New York, and ARTHUR C. FRASER, residing in the city of Brooklyn, in the county of Kings, State of New York, have invented certain new and useful Improvements in Locomotive-Cab Electric Railway-Signals, of which the following is a specification.

This invention relates to railway-signals of that class wherein the signals are given either visually or audibly in the cab of the locomotive as distinguished from those wherein it is given visually along the track. In such systems an electric circuit is carried by the locomotive and other electric circuits are provided along the track, the construction being such that when the locomotive reaches certain signaling-points the circuit on the locomotive is brought into connection with one or more circuits on the track. This connection has sometimes been proposed to be made by means of some sort of contact device on the locomotive making electrical contact in passing with a contact rail, plate, or other device located on or along the track and which constitutes the terminal of the track-circuit. Considerable practical difficulties exist in the operation of such contact means as have been heretofore proposed.

The present invention aims to provide an improved construction of contact device which shall overcome the difficulties heretofore existing and shall render the application of such systems of electric signaling practicable.

According to this invention the contact device constituting the terminal of the track-circuit consists of a rail or plate laid along the track and preferably midway between the track-rails. For this purpose an ordinary railway-rail laid upside down may be used, its broad base constituting the contact-plate. Its middle portion is mounted with its base at a suitable height above the track-rails—say, for example, two inches—and its end portions are bent downwardly to form rising and falling inclines. The contact device carried by the locomotive is constructed, preferably, with a contact-wheel mounted or hung beneath the locomotive or tender and projecting down to a level higher than that of the track-rails, but lower than the highest portion of the contact-rail, so that it will pass freely over crossing tracks and switches, but upon encountering the inclined end of a contact-rail it will be gradually raised thereby and will slide or roll along the level top thereof, descending the falling incline at the opposite end of the rail. This wheel is made a part of or is connected with the circuit on the locomotive, so that during the time it is passing over the contact-rail it connects the locomotive-circuit with the track-circuit. According to our invention we mount the contact-wheel on springs to make it freely movable up or down while pressing it firmly downward and provide some suitable stop for limiting its downward movement, so that it shall hang always at the proper level. The construction of the wheel and its mountings is such as to give the utmost lightness and elasticity in order to avoid liability of fracturing the parts by the impact of the wheel against the contact-rail when running at high speed. The mounting of the wheel is such that its operation will be equally perfect whether the locomotive is traveling backward or forward. In order to insure the making of perfect contact when the track is covered with snow or ice, the wheel is made with a sharp edge and its mounting-springs force it firmly downward, so that this edge is forced through any layer of snow and through any coating of ice that is liable to cover the contact-rail. In order to insure a perfect electrical contact notwithstanding the existence of any rust or scale upon the contact-rail, the contact-wheel is subjected to the action of a friction-brake, whereby its rotation is impeded and it is made to partly turn and partly slide during its passage over the rail. By this means the contact-rails are kept polished and free from rust and the contact-wheels have their peripheries also polished, so that good conducting-surfaces are formed.

An important feature of our invention is that it provides means for assuring that the circuit connections with the contact-wheel are perfect, or, in other words, that the electric current from the generator carried on the locomotive properly reaches the contact-wheel, and hence is properly transmitted to the track-circuit. To this end we include the wheel in the locomotive-circuit as a part thereof, so that the breaking of connection between said circuit and the wheel would break the entire locomotive-circuit, and thereby cause a cessation of the normally flowing current therein, whereby the existence of a defect is immediately made perceptible. For carrying this feature into effect we provide the contact-wheel with two hubs on its opposite sides, embraced by two friction brakes or clamps insulated from each other and which themselves are included in the circuit, so that a current enters by one clamp into one hub of the wheel, flows through the wheel, and passes out from its other hub into the other clamp and through the latter back over the remaining portions of the locomotive-circuit.

Another feature of our invention provides improved means for breaking the locomotive-circuit upon the lifting or mechanical displacement of the contact-wheel. With a normally closed locomotive-circuit it is desirable on making connection with the track-circuit to cut the two serially together, making them for the moment one complete and undivided circuit, since in this manner any defect in the track-circuit whereby the current is interrupted will cause an equal interruption of current on the locomotive-circuit and may be made thereby to give a signal of defect. The operation of such a mechanical circuit-breaker as heretofore proposed is attended with practical difficulties which our invention is designed to obviate.

Our invention is also applicable to provide means for closing a normally open circuit or branch circuit on the locomotive upon the displacement of the contact-wheel by the contact-rail. The closing of such a branch is useful for various purposes in connection with locomotive-cab signals.

Figure 4:
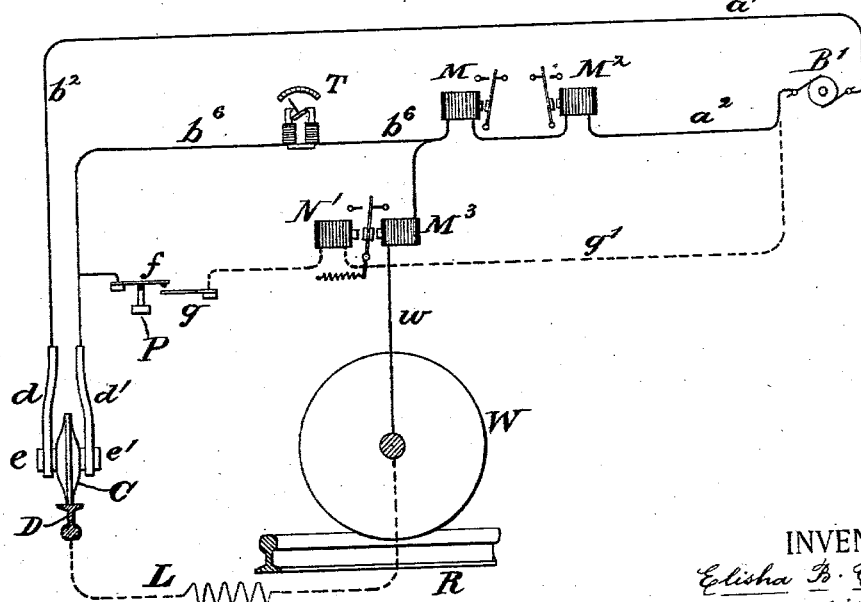
Figure 5:
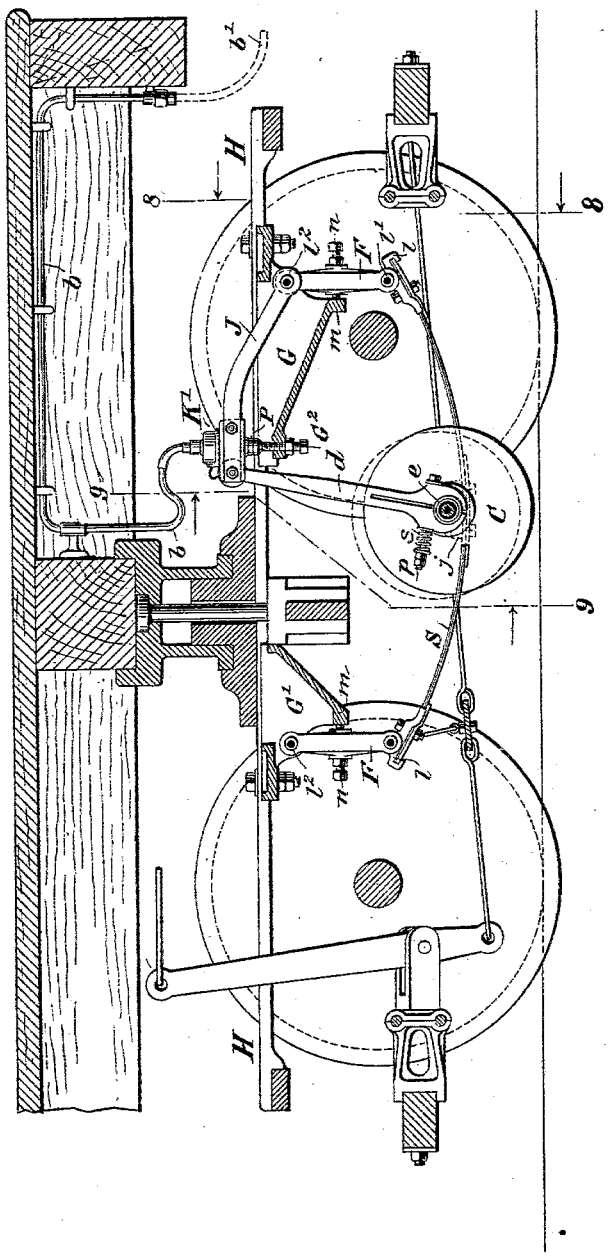
Figure 6:
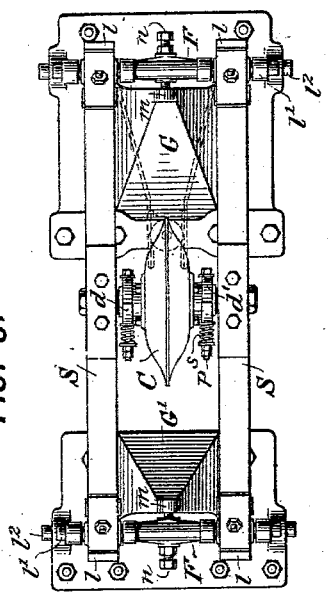
Figure 7:
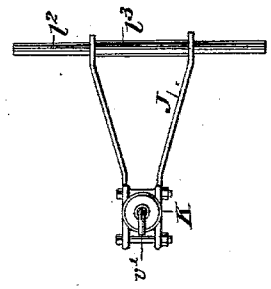
Figure 8:
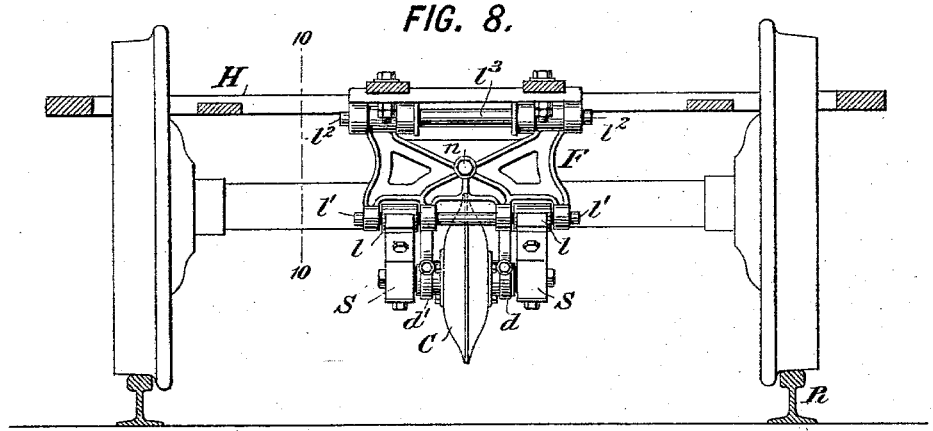
Figure 9:
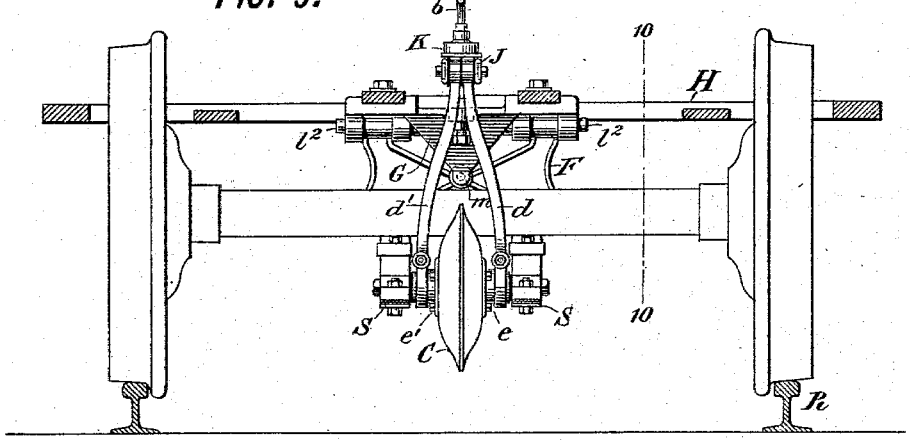
Figure 10:
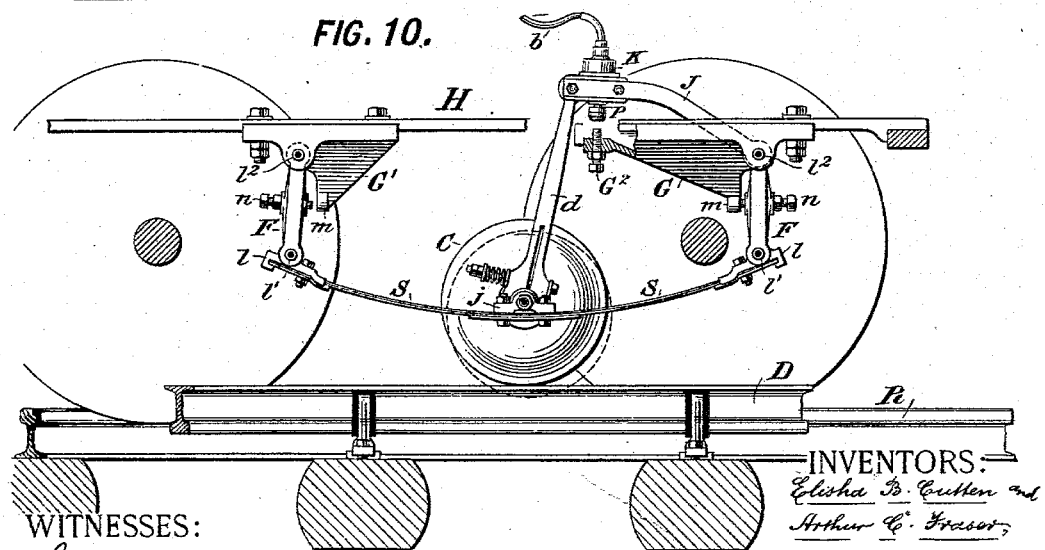

Figure 1 of the accompanying drawings is a fragmentary side elevation of a locomotive, showing diagrammatically the application of our invention thereto. Fig. 2 is a side elevation of the contact-rail designed to be laid between the track-rails and showing the contact-wheel at the instant of encountering it. Fig. 3 is a circuit-diagram showing the locomotive-circuits so far as is necessary to an understanding of our invention. Fig. 4 is a similar diagram showing a modified arrangement of locomotive-circuits. Fig. 5 is a vertical longitudinal mid-section through the front truck of the tender, showing the application of our contact device thereto. Fig. 6 is an underside plan of the contact device removed. Fig. 7 is an upper side plan of a detail. Fig. 8 is a front end elevation of the contact device, the tender-truck being in section on the line 8 8 in Fig. 5. Fig. 9 is a vertical transverse section on the line 9 9 in Fig. 5. Fig. 10 is a side elevation of the contact device, showing it displaced by a contact-rail, the truck being in section on the lines 10 10 in Figs. 8 and 9. Figs. 11, 12, and 13 are fragmentary detail views, on a larger scale, showing the circuit closing and breaking device, Fig. 11 being a transverse section on the line 11 11 in Fig. 12, Fig. 12 being a longitudinal mid-section, and Fig. 13 being a horizontal section on the line 13 13 in Figs. 11 and 12 and looking upwardly. Fig. 14 is a detail view, on a larger scale, showing the contact-wheel in vertical transverse section in a plane coincident with the axis of its shaft. Fig. 15 is a side view in section in the plane of the line 15 15. Fig. 16 is a transverse section of the contact-rail, showing the contact-wheel rolling over it. Fig. 17 is a fragmentary section in the same plane as Fig. 14, showing a modified construction of the contact-wheel. Fig. 18 is a circuit-diagram showing a modification. Fig. 19 is a fragmentary vertical longitudinal section showing a modification of the construction shown in Fig. 5. Fig. 20 is a side elevation showing another modification.

Fig. 1 shows the general installation of a locomotive with signaling circuits and apparatus such as are required by our invention. In the cab is provided a signal-box A, containing the instruments for giving the visual or audible signals which are provided for. On any suitable part of the locomotive is mounted a dynamo-box B, in which is inclosed a small dynamo-electric machine, a small motor for driving it, and any suitable means for governing this motor in order to generate a uniform electromotive force or otherwise to control it, or a battery may be provided instead. Beneath the locomotive or tender in any convenient place is provided a contact device, designated as a whole by the letter C' and comprising as its essential feature a contact-wheel C and its mounting. From the contact device leads a tube or cable $b$, inclosing one, two, or more electric wires and terminating in connection with the signal-box A. From this box another cable $a$ leads to the dynamo-box B. The cables $a$ and $b$ are laid in permanent manner, so as to be properly protected against injury, preferably by being inclosed in iron pipes or otherwise shielded. When the contact device is hung from the tender, the cable $b$ will include a flexible portion $b'$, hung between the engine and tender in similar manner to the hanging of the water and steam hose connections already used on locomotives.

The arrangement of electric circuits may be understood from Fig. 3. From the dynamo or other electric generator B' leads a wire $a'$, which extends to the signal-box and thence by wire $b^2$ to a connecting-arm $d$, engaging a hub $e$ of the contact-wheel C, so that the current passes thus into this wheel and from the other hub $e'$ thereof returns through an arm $d'$ and is led by wire $b^3$ to a contact-spring $f$, which normally is in contact with a spring $f'$, from which a wire $b^4$ extends back to the signaling-box A, Fig. 1, where it traverses the coils of any suitable signal-magnets (designated as M' and M) and passes by wire $a^2$ back to the dynamo B'. Thus a closed circuit is formed, the current in which is normally flowing and follows the course thus indicated. In the signal-box A or elsewhere an earth connection is made between the wire $b^4$ on the one hand and the frame and wheels of the locomotive on the other, this connection being denoted in the diagram by the line $w$, leading to the wheel W, whereby the circuit is put into communication with the track-rails R. When the contact-wheel $c$ touches a contact-rail D, Fig. 2, a current passes from the generator B', through wires $a'$, $b^2$, arm $d$, wheel C, and rail D, to an outside circuit through a line or through the track, which is designated diagrammatically in Fig. 3 at L, the opposite terminal of which being grounded or otherwise connected with the track-rails R the current passes through the latter into the locomotive-wheels W and by wire $w$ through magnets M' and M and by wire $a^2$ back to the dynamo. If the current thus passing is of sufficient volume, it excites magnet M sufficiently to cause it to attract its armature, and thereby give a danger-signal through any suitable means. The magnet M is adjusted to be unaffected by the normal current—as, for example, by making its retracting-spring so strong that it holds off the armature at all times except when the magnet is abnormally energized by a current of abnormal volume. The track-circuit L may be of any kind or arrangement adapted to interpose a normal resistance when "safety" conditions prevail, thereby keeping down the volume of current to the normal; but when "danger" conditions prevail the resistance on the track is reduced by short-circuiting or otherwise sufficiently to permit the flow of an abnormal volume of current sufficient to actuate the magnet M. The lifting of the wheel C by running up the inclined end of the contact-rail from the position shown in full lines in Fig. 2 to that shown in dotted lines acts to separate the springs $ff'$, and thereby to break the normal locomotive-circuit first described. If through any cause no current passes over the line L, as in case of a break or other defect in the line or track circuit, the breaking of the normal locomotive-circuit will cause a cessation of the current therein, thereby demagnetizing the magnet M', which normally holds its armature attracted, whereupon its retracting-spring draws off its armature, and thereby gives a signal of "defect" by any suitable means. The same defect-signal will be given in case of any accidental rupture in any of the circuit connections forming part of the locomotive-circuit. If the defect-magnet M' is demagnetized only during the time that the wheel C is displaced by running over the contact-rail, it is known that the defect exists in the external line L, while if the defect-magnet is demagnetized at any other time or continues demagnetized it is known that the defect exists in the normal locomotive-circuit. It will be observed that the sole function of the circuit-breaking springs $ff'$ is to operate the defect-magnet M' when the contact-wheel is displaced by limiting the current traversing this magnet to that which also traverses the line, so that if no current traverses the line the magnet is demagnetized. In Fig. 3 is also shown a circuit branch $g'$, (denoted by the dotted line,) which leads from a contact-spring $g$, arranged to be touched by the spring $f$ when the contact-wheel C is raised and which terminates in connection with the wire $a^2$, leading to the dynamo. This circuit, which is normally open, but which is closed while the wheel C is displaced by the contact-rail, may be for the purpose of operating an electromagnet N, the purpose of which is not essential to our present invention. We will remark, however, that this magnet may be used for operating any sort of counter or recorder for keeping a record of the progress of the locomotive, or it may be utilized to cut off the current from the line after a certain time has elapsed in order to prevent the injury of magnets or other mechanism from overheating in case the locomotive were to stop with the wheel C in contact with a contact-rail.

It will be seen from the preceding description that the contact-wheel C is made a part of the normally closed locomotive-circuit, so that any defect by which a current fails to reach this wheel will render the entire circuit defective, and consequently will operate the defect-magnet M' or any other means that may be substituted therefor to indicate the condition of the circuit. So long as the defect-magnet does not operate, the engineer is assured that the current reaches the wheel C and that when this wheel encounters a contact-rail a current will be sent over the exterior circuit. If that circuit be incomplete, the operation of the circuit-breaker $ff'$, which essentially serves to cut the locomotive serially into circuit with the line, so that the two constitute for a moment one circuit, will operate the defect-magnet.

Our invention may be applied in connection with various systems of railway-signaling wherein the signal is to be displayed or given on the locomotive. Our invention is adapted for operation in connection with any system of signaling wherein a track-circuit is provided terminating in a contact-rail at a signaling-point, with any means in connection with this track-circuit for varying the resistance of the circuit according to whether the conditions are those of safety or danger. For normal or safety conditions the track-circuit has a certain normal resistance sufficient to cause a normal current to flow on the locomotive-circuit. For danger conditions this resistance is in any way lowered, so as to increase the volume of current flowing to such an abnormal extent as to operate the danger-magnet. Although the means for controlling the track-circuit forms no part of our present invention, yet we will state that such means may consist of an instrument such as that disclosed in the application of Arthur C. Fraser, filed February 26, 1891, Serial No. 382,940, Patent No. 548,435, dated October 22, 1895. The track contact-rails D are preferably mounted permanently on the track; but portable contacts might be provided to be placed on the track for giving an emergency signal to an approaching train.

We will now proceed to describe the mechanical features of the contact device.

The contact-wheel C is preferably of the construction shown in Figs. 14 and 15. It here consists of two disks $c$ $c$, of elastic-steel plate, pressed into concavo-convex form or dished, these two plates being placed together edge to edge and forced toward each other at their middle portions, so that their edges are pressed tightly together. In the construction shown they are mounted on a sleeve $i$, having flanges $i'$ $i'$, between which and the flanges $e^2$ $e^2$ on hub-sleeves $e$ $e'$, respectively, the steel disks are clamped. The disks when first brought together have a greater space between them at their hubs than that between the seating-faces of the flanges $i'$ and are pressed to force them against these flanges by drawing up the flanges $e^2$ by means of screw-bolts $k$, of which three are preferably used, as shown in Fig. 15. By this construction the contact-wheel is made extremely light and very elastic, so that a blow struck against it edgewise, as when it encounters the inclined end of a contact-rail, will not fracture it, but will be received elastically and transmitted to the sleeve $i$, which also is made as light as possible consistent with proper strength. To prevent the unscrewing of the nuts from the bolts $k$, rings $k'$ are applied having flat faces, which come against the sides of the bolt-heads and nuts, respectively, and keep them from turning, these rings being applied after the bolts are finally tightened and being themselves held in place by the brake-arms $d$ $d'$, Fig. 9. The sleeve $i$, which constitutes, essentially, the hub portion of the contact-wheel, turns freely on a shaft E, a tubular sleeve $h$, of insulating material, being interposed in order to insulate the contact-wheel from its mounting. The shaft E is made tubular in order to render it as light as possible, and its ends are passed through blocks $j$ $j$ and fixed firmly thereto by nuts or otherwise. The blocks $j$ $j$ are mounted on springs S S, as shown in Fig. 10, being securely attached to the middles of these springs. The springs S S are preferably plates of spring-steel suitably curved and extending longitudinally parallel with one another, as shown in Fig. 6. The blocks $j$ are attached to their middles, respectively, while their ends are mounted in any suitable manner beneath the framework of some part of the locomotive, preferably the tender thereof. In the preferred construction the ends of the springs are fastened to shoes $l$ $l$, which are pivotally connected to the lower ends of hangers F F, the upper ends of which are pivotally connected to frames G and G', respectively, which are securely bolted to the truck-frame H of the tender. Preferably the pivotal connection between the shoes $l$ $l$ and the hanger F is made by a tubular shaft $l'$, Fig. 8, while that between the upper end of the hanger and the frame G or G' is made by a tubular shaft $l^2$, these tubular shafts being most conveniently made of gas-pipe. The frames G G' are provided with downwardly-projecting portions $m$ $m$, which constitute substantially brackets or stops, which abut against the inner sides of the hangers and limit their swinging movement toward each other. Normally both hangers are drawn together by the tension of the springs S S, so that they abut against these stops, thereby holding the wheel C at a certain height. When, however, the wheel C is lifted up by a contact-rail, the straightening out of the springs S S forces the lower ends of the hangers to swing apart. In going forward the forward hanger F will remain in contact with the stop $m$, while the rear hanger will swing rearwardly out of contact therewith, as shown in Fig. 10. In running backward these effects will be reversed. In order to adjust the parts and bring the wheel C to the proper height, the hangers F F are provided with adjusting-screws $n$ $n$, the ends of which strike the stops $m$ $m$ and which may be screwed out or in in order to straighten the springs S S more or less, and thereby lift the contact-wheel more or less. The contact device thus constructed has the only parts which are displaced by contact with a contact-rail—namely, the wheels C and springs S S—made very light, so as to afford the least possible inertia, and consequently to strike the least blow and afford the least resistance at the moment of impact against the contact-rail, and so as to have the minimum tendency when being lifted by the inclined end thereof to continue to move upwardly, and thereby to rebound from the contact-rail. By such rebound the electrical connection between the wheel and rail would be interrupted, the tendency of which would be to give a defect-signal. This difficulty we overcome, first, by making the inclined end portion of the contact-rail with a very gradual incline, so that the movement of the contact-wheel shall not be made with too great suddenness; second, by making the displaced parts as light as possible, so that their inertia tending to continue them in motion shall be as little as possible, and, third, by making the springs S S so stiff that their tension is amply sufficient to hold down the contact-wheel into firm and intimate contact with the contact-rail, resisting any tendency of the wheel to rebound by reason of its inertia.

The tension of the springs S S should be considerably in excess of what will ordinarily be sufficient to accomplish this result in order that at the very highest speeds and under the most exceptional circumstances their tension shall be ample to suppress the rebounding tendency of the contact-wheel. These springs consequently keep the hangers F F pressed very strongly against the stops $m\ m$. One purpose of the adjusting-screws $n\ n$ is to enable the springs to be tightened to the requisite tension, the hangers being applied with the screws $n\ n$ retracted and the springs consequently to that extent relaxed and the screws being afterward projected to tighten the springs to their requisite tension at the same time that the vertical position of the wheel is properly adjusted. The strong downward pressure imparted by the springs serves also the important purpose of insuring an intimate electrical contact between the contact-wheel and the contact-rail by forcing out or crushing any intervening particles and bringing them together metal to metal. A serious difficulty with contact devices of this character is that due to the presence in winter of snow or ice upon the tracks. A contact-wheel with a flat rim or tread would if the tracks were covered by snow simply roll down or compress the coating of snow and form it into a thin dense cake over the contact-rail. By making the contact-wheel of the shape shown best in Fig. 14 it constitutes a rotary knife having a substantially sharp edge, which cuts through and wedges apart any covering of snow and sinks down into direct contact with the rail. Snow, however, affords less difficulty than ice, as brushes might be mounted beneath the locomotive to sweep off any snow from the contact-rail. A coating of ice constitutes a glass-like insulating covering for the contact-rail and must be cut through in order to bring the wheel into metallic contact with the rail. To this end we construct the wheel with a suitably sharp edge, and we impart to it a heavy downward pressure by means of the springs S S sufficient to cause this edge to cut through any coating of ice that will under any normal circumstances exist upon the contact-rail. The exact degree of sharpness of the edge will depend upon the amount of pressure of the springs, a sharper edge being required for a comparatively light than for a heavy pressure. The tension of the springs must be sufficient to overcome the crushing strength of the portion of ice intervening between the edge of the wheel and the rail. It is not necessary to provide for extremely-thick coatings of ice, as these are not liable to form, except where an entire track has been inundated. Ice forming from rain or snow will be cut and crushed or caked off at comparatively frequent intervals by the passage of successive trains, which on a road doing sufficient business to justify the employment of a complete system of signals will pass so often as to leave but little opportunity for the formation of any considerable thickness of ice between the passings of successive trains. In the case of an exceptionally-thick coating of ice, due to an inundation or other exceptional cause, the engineer knowing the condition of the track will understand that a defect-signal, if given, results from the ice being so thick that the contact-wheel is unable to cut through it, and hence that the defect exists in that portion of the circuit between the contact wheel and rail. He will thus recognize that for the time being—that is, in passing over a portion of road where the rails are thus exceptionally coated—the signaling system is inoperative and he must proceed with caution. Such circumstances, however, will occur with extreme rarity if the parts of our contact device are properly proportioned. In order to further provide that the wheel C shall make good electrical contact with the rail D, we construct it to have a rubbing or sliding movement thereover, it being well known to electricians that a rubbing contact is preferable to any other by reason of its rubbing off any scale or oxid that may exist between the respective contact-surfaces. To this end we apply a brake or drag on the contact-wheel, so that it shall not freely revolve in rolling over the contact-rail, but shall partly turn and partly slide. This brake might be made so that the wheel would wholly slide; but we prefer that it shall revolve to some extent in order to continually present a new portion of its periphery to the wear of the rail, and consequently to cause it to preserve a perfect circle as it wears. To apply this brake, we provide a frictional grasping device. (Shown best in Fig. 5.) The arm $d$ here shown is divided at its lower portion and is formed with jaws which embrace the hub $e$ of the contact-wheel, and a screw $p$ passes through the jaws and is adjustable to force them together and cause them to embrace the hub frictionally between them, the spring $s$ being interposed to impart elasticity and take up wear. We provide by preference two arms $d\ d'$, both alike and engaging the respective hubs $e\ e'$ of the wheel, as shown in Fig. 9. When the wheel encounters the contact-rail and tends to revolve, these arms $d\ d'$ by their frictional engagement with its hubs tend to revolve with it. To resist this tendency, we connect their upper ends pivotally to the end of a lever J, which is pivoted to some fixed part, preferably the tubular shaft $l^2$. This lever is preferably formed of V-arms in the manner shown in plan view in Fig. 7, these arms being kept apart where they engage shaft $l^2$ by a tube $l^3$, of gas-pipe. As the contact-wheel is displaced upwardly these arms $d\ d'$ move up with it and communicate its motion to the end of the lever J, which is vibrated thereby to a slight extent around the shaft $l^2$. These parts should be made as light as possible to have the minimum of inertia. The brake might be otherwise applied to the wheel C in any of the numerous ways that are known in the art for applying brakes to rotary wheels.

We will now describe the preferred construction for operating the circuit breaking and closing springs $f$, $f'$, and $g$ and means for conducting the current to the contact-wheel.

The circuit breaking and closing springs are inclosed in a box K, carried by the lever J, as shown in Figs. 11 and 12. This box has a cover K' fitting over it and made moisture-proof by an interposed packing $q$, Fig. 12, of rubber or other suitable material. It is fastened down by screws $q'$ entering the box K beneath. Within the box K works a plunger or rod P, which passes out from the bottom of the box and is formed with a head at its lower end. It is suitably guided within the box, so that it can slide longitudinally up and down therein, and it is pressed strongly downward by a stiff spring $r$, reacting upwardly against some part of the box and downwardly against a collar or other suitable provision applied to the plunger P, preferably against a shoulder thereon. To prevent the entrance of moisture through the hole in the bottom, a rubber washer $r'$ is interposed between the bottom of the box and the head of the plunger. The upper end of the plunger is preferably formed with an insulating block or cushion $t$, which is advantageously connected to the plunger through an interposed spring-arm $t'$. The frame G or other fixed part is provided with an abutment $G^2$, constructed, preferably, as a screw in order that it may be adjustable to different heights. When the wheel C is down in its normal position, the box K rests against this abutment by reason of the intervention of the head of its plunger P, so that the plunger is pressed upwardly within the box, as shown in Fig. 12. The rubber washer $r'$ is thus compressed and makes a weather-tight joint at the bottom of the box. Upon first lifting the contact-wheel the consequent lifting movement of the box K carries it off the abutment, while the plunger P, being pressed down by its spring $r$, remains stationary until lifted by the contact of shoulders $t^2$ or $t^3$, formed on the box, with abutting shoulders just above them formed on the plunger, so that the plunger is lifted with the box. Thus upon the lifting of the box the plunger executes a downward movement relatively to the box, so that it projects downwardly therefrom, as shown in Fig. 10.

The circuit breaking and closing springs $f$, $f'$, and $g$ are attached to a disk $u$, of insulating material, which is fastened within the cover K', as shown best in Fig. 13, where one of the springs $g$ is partly broken away. The three wires $b^2$ $b^4$ $g'$, Fig. 3, are carried into the cover K' through a stuffing-box $v$, making a moisture-proof connection. The three wires are inclosed in a flexible cable $b$, which hangs in a pendent loop from the body of the tender, as shown in Fig. 5, so as to accommodate the movement of the tender-truck in turning curves, as also to accommodate the lifting and falling movements of the box K. To better support this cable where it enters the box, the latter is formed with a gooseneck $v'$. The three wires entering the top of the box pass through holes in the disk $u$, the wire $b^4$ being connected to the spring $f'$, wire $g'$ being connected to the spring $g$, and the wire $b^2$ being connected to a binding-screw, Fig. 13, which couples it to the continuation of this wire $b^2$, which passes out through a hole in the side of the cover and being bent into a loop is fastened by a binding-screw to the upper end of the arm $d$, as shown in Fig. 11. The upper end of the arm $d'$ is similarly fastened to a wire $b^3$, which being looped is carried back into the cover through the same hole and is connected by a screw to the fixed end of the spring $f$. The wires $b^2$ $b^3$ where they pass through the holes in the cover are inclosed in a piece of rubber tubing $b^5$ in order to make a weather-tight joint, as well as to hold the wires together and prevent their displacement. By comparing Figs. 11, 12, and 13 with Fig. 3 the connections may be readily traced. The upper ends of the arms $d$ $d'$ are insulated from each other and from the box K, lever J, and other parts by interposed bushings and washers $w'$, of insulating material, as shown in Fig. 11. In the normal position the plunger P holds the spring $f$ compressed upwardly into electrical contact with the spring $f'$, as shown in Fig. 12. In this position the spring $g$ is held out of contact by coming against a plate $u'$, of insulating material, which prevents it springing upwardly far enough to touch the spring $f$. When, however, the contact-wheel is lifted, the downward movement of the plunger P relatively to the box K frees the spring $f$, which flies downward by its own elasticity, and breaking contact with the spring $f'$ it makes contact with $g$. The spring $f'$ follows it downward until stopped by contact with the same insulating-plate $u'$, while a stop $u''$ limits the downward movement of the spring $g$, so that the full tension of the spring $f$ is effective to press it into firm electrical contact with the spring $g$. The springs $f'$ and $g$ are light springs, while the spring $f$ is much stronger. Thus an upward movement of the contact-wheel somewhat less than the play of the plunger P as limited by its stops $t^2$ or $t^3$ (whichever comes into play) suffices to break the normal circuit on the locomotive and if the circuit $g'$ is used to close this circuit. The circuit $g'$, however, is merely an accessory and may be omitted. The electrical features—namely, the contact-springs and all the electrical connections therewith— are thoroughly inclosed and protected from moisture and mechanical injury by the weather-proof box K, with its cover K'.

The adjusting-screw $G^2$ serves as a stop additional to the stop-screws $n$ $n$ for determining the height of the contact-wheel, so that by proper adjustment it may receive part of the tension of the springs S S and relieve the screws $n$ and stops $m$ to some extent therefrom.

Where an inverted railway-rail is used as the contact-rail D, as shown in Fig. 16, its broad face constitutes a plate of sufficient width to insure the contact therewith of the contact-wheel, which by reason of the lateral movement of the truck of the tender may move from side to side to about the extent indicated by the dotted lines in Fig. 16. This lateral motion, however, is not sufficient to carry the contact-wheel off from the side of the rail.

Instead of constructing the contact-wheel so that the edges of the disks $c$ $c$ constitute the cutting edge a separate ring $c'$ may be used therefor, as shown in Fig. 17, this ring being embraced between the two disks $c$ $c$.

Fig. 4 shows a modified circuit arrangement wherein no circuit-breaker is employed, the spring $f'$ being consequently omitted from the box K in Fig. 12. Instead of a normally closed circuit on the locomotive there is in this form a permanently-closed circuit passing from the dynamo B' by wires $a'$ $b^2$ to conducting-arm $d$, hub $e$, contact-wheel C, hub $e'$, arm $d'$, thence by wire $b^6$ through the coils of magnets M M$^2$ and by wire $a^2$ back to the dynamo. Included in the wire $b^6$ is a current-meter or other electrical indicating instrument T, which by the deflection of a needle or otherwise shows that the current is properly flowing through the closed circuit just described and would give indication if through any break in this circuit the current were to cease. When the contact-wheel C touches the rail D, a current passes over the line or external circuit L, returning by the track-rail R, and passing thence by the locomotive-wheels W and connection $w$ through a magnet M$^3$ and thence through magnets M and M$^2$. The circuit-closing springs $f$ $g$ are retained to close the circuit branch $g'$ upon the displacement of the contact-wheel, this branch having a magnet N', which acts upon the same armature-lever as the magnet M$^3$, but in a contrary direction. If the line L is complete, the current passing over it energizes the magnet M$^3$, which holds its armature attracted, and the magnet N', which is subsequently energized by the closing together of the springs $f$ $g$, is not strong enough to draw the armature away from it; but in case of a defect in the external circuit L the magnet M$^3$ would remain inert or would be acted upon by a current so feeble as to give it but very little attractive power, so that upon the closing of the circuit $g'$ the magnet N' is enabled to attract the armature, and thereby to give a defect-signal. The magnet M$^2$ (not shown in Fig. 3) may be added in case different signals are to be given (as "caution" and "danger") by currents of different strength. We illustrate this arrangement because it is a modification involving the use of only part of our invention—that is to say, it omits the circuit-breaking springs for breaking the normally closed locomotive-circuit.

Fig. 18 is a diagram showing another modification wherein there is no signal for indicating a defect in the external line and no breaking or closing of the locomotive-circuits. The locomotive carries a normally closed circuit $a'$ $b^2$ $b^6$ $a^2$, which includes the contact-wheel C and conducting-springs $d^2$ $d^3$, so that the circuit is completed only through the wheel C. A danger-magnet M and a defect-magnet M' are included in this normally closed circuit, the defect-magnet being solely to indicate any accidental breaking of or defect in the closed locomotive-circuit. When the contact-wheel C touches the contact-rail D, a current passes over the external circuit L and returns by track-rail R, locomotive-wheels W, and connection $w$ to the circuit-wire $a^2$. With this construction the contact-box K and its inclosed plunger and contact-springs are omitted. The conducting-springs $d^2$ $d^3$ may be carried by the springs S S.

Fig. 19 is a fragmentary view showing a modified mounting for the contact-wheel and a modification of the circuit-breaker. The contact-wheel is mounted, as before, on a shaft between bearing-blocks $j$, which blocks are fastened to the ends (instead of to the middles) of two springs S', the other ends of which are fastened rigidly to a frame G$^3$. The arms $d$ $d'$, the clamping-jaws of which engage the hubs of the wheel, as before described, are pivoted to a lever J'. The arm $d$ extends above this lever and is fastened at its end to the wire $b^2$, while the arm $d'$ terminates at its pivotal connection and is connected by a wire with a contact-spring $f$, carried by but insulated from the lever J'. When the contact-wheel is down in its normal position, this spring rests in metallic contact with the spring $f'$, carried by but insulated from a bracket $y$, which is fastened rigidly to some part of the body of the tender, so that as the tender-truck turns on its pivotal connection to accommodate itself to curves the springs $f$ $f'$ are caused to rub against one another, so that their contacting surfaces are kept polished. The bracket $y$ may be made adjustable in vertical direction to determine the height of the contact-wheel. This construction affords a simple and very easily constructed substitute for that first described, but is inferior thereto in that the circuit-breaking springs are exposed, so that particles of cinders or dust may find their way between them, thereby impairing the circuit connection.

Our invention may be modified in many ways in so far as the mechanical constructions of the various parts are concerned. For example, many different kinds of circuit breakers and closers are known in the electrical art and may be substituted for the particular construction for these purposes that we have adopted. The essential features of our invention will be hereinafter defined in the claims.

We have referred throughout this specification to the contact-wheel being vertically displaced by contact with the contact rail or plate along the track. This would occur when a contact rail or plate is laid in the manner shown in Fig. 2—for example, so that its contact-surface slopes upwardly, the contact-wheel being in such case mounted to admit of its displacement upwardly. It is obvious, however, that the entire apparatus might be otherwise arranged, so that the displacement would occur in a different direction than upwardly—for example, laterally or obliquely or downwardly. It is immaterial to our invention whether the contact-rail be mounted on the track between the track-rails and to displace the contact-wheel upwardly or be mounted at one side to displace it laterally. It will also be apparent that in some cases a non-rotative contact part might be substituted for a rotative contact-wheel, so that the expression "contact-wheel" as used in this specification and claims must not be understood as being necessarily limited in all instances to a rotative wheel, since it might in some cases find its equivalent in some non-rotative contact part. We have also referred to the contact-wheel as having hubs $e$ $e'$ at opposite sides; but it will be understood that in a broad sense these hubs may be any suitable round or annular contact parts or surfaces movable with the wheel and adapted to be engaged by the rubbing contact of the conducting-arms or friction-brakes $d$ $d'$ and not necessarily made so as to have the appearance of "hubs," commonly so called. It will also be understood that the form or construction of the friction brake-arms or rubbing contact-conductors $d$ $d'$ might be greatly modified. For example, it is not essential that one part shall perform both functions of mechanical brake and electric conductor, although this is preferable.

A modification of the mounting for the contact-wheel C is shown in Fig. 20. In lieu of hangers F F, pivoted to the frames and to the ends of the springs S S, this construction employs sliding blocks F' F', working in dovetail grooves in the lower portions of the frames, which are here lettered $G^4$ $G^5$. Stop-screws $n'$ $n'$ are applied to limit the inward movement of these sliding blocks. The springs $S^2$ by tending to bow downwardly hold the blocks drawn tight against the stop-screws until the wheel is displaced upwardly by striking the contact-rail, whereupon the rearward block will slide rearwardly away from its screw to admit of the straightening of the springs.

We claim as our invention the following-defined novel features or improvements, substantially as hereinbefore specified, namely:

1. The combination with a track-circuit and contact-plate of the following provisions on a locomotive viz: a normally closed electric circuit, an electric generator maintaining a current thereon, and a signal instrument controlled by said circuit, with a contact-wheel and a mechanical mounting therefor movable when displaced by contact of the wheel with said plate, said wheel included as a part of said circuit so that it is necessarily traversed by the normal current thereon, whereby the continuity of the current gives assurance that the said contact device is in proper circuit connection and will hence conduct the current to said track-circuit on making contact with said plate.

2. The combination on a locomotive of a normally closed electric circuit, an electric generator maintaining a current thereon, and a signal instrument controlled by said circuit, with a contact device mounted to be displaced bodily by contact with a contact-plate along the track, a mechanical mounting for carrying said device admitting of its being so displaced, said contact device insulated from its mounting, a connection with said circuit conducting the current thereof into said contact device, and an independent connection with said contact device conducting the current therefrom back to said circuit, whereby the contact device is included as a part of said circuit so that it is necessarily traversed by the normal current thereon.

3. The combination on a locomotive of a normally closed electric circuit, an electric generator maintaining a current thereon, and a signal instrument controlled by said circuit, with a contact device consisting of a rotative wheel mounted elastically so as to be capable of displacement by a contact-plate along the track and insulated from its mounting, a rubbing contact by which the current from said circuit is conducted to said wheel, and an independent rubbing contact by which the current is conducted from said wheel back to the circuit, whereby the wheel is included as a part of said circuit so that it is necessarily traversed by the normal current thereon.

4. The combination on a locomotive of an electric circuit and a contact device in connection with said circuit consisting of a contact-wheel and an elastic mounting therefor consisting of a bowed plate spring or springs on which it is mounted and which acts to press it strongly outward, and abutting stops for limiting its outward movement and retaining said spring under tension, whereby the wheel is mounted at a certain definite position, and when displaced therefrom by touching a contact-plate, the full pressure of the spring is exerted to press it into intimate contact therewith.

5. A locomotive contact device consisting of two parallel plate-springs, a contact-wheel between them carried by their middles, stops for limiting the projection of said wheel, and retaining said springs under tension, and supports for connecting the ends of the springs to the locomotive.

6. In an electric contact device for a locomotive, a contact-wheel constructed of two cupped disks of elastic metal plate pressed together edge to edge, whereby it is given the maximum of strength and elasticity with the minimum of inertia.

7. The combination to form an electric contact device for a locomotive consisting of a contact-wheel adapted to roll over a contact-plate, a mounting adapted to support said wheel, and a friction-brake applied to said wheel to retard its rotation, whereby in passing over a contact-plate it partly rolls and partly slides thereon, so that a rubbing contact between its periphery and the plate is assured.

8. The combination to form an electric contact device for a locomotive, of a contact-wheel adapted to ride over a contact-plate along the track, a mounting for supporting said wheel, a friction-brake engaging said wheel and acting to retard its rotation so that in passing over a contact-plate it is caused to partly slide thereover, and the electric circuit on the locomotive connected to said brake, whereby the brake constitutes a rubbing contact for connecting said circuit to the contact-wheel.

9. In an electric contact device for a locomotive, a contact-wheel, a mounting adapted to support said wheel, two friction-brakes engaging said wheel in different places, and the electric circuit on the locomotive connected to the respective brakes, whereby the current enters the wheel through one brake and passes out of it through the other.

10. In an electric contact device for a locomotive, the combination of a contact-wheel adapted to roll over a contact-plate and constructed with a hub, a mounting adapted to support said wheel, and a friction-brake applied to said wheel to retard its rotation and constructed to frictionally engage the hub of said wheel.

11. In an electric contact device for a locomotive, the combination of a contact-wheel adapted to ride over a contact-plate and constructed with hubs on opposite sides, a mounting for supporting said wheel, and two friction-brakes consisting of arms having frictional surfaces engaging the respective hubs of said wheel.

12. In an electric contact device for a locomotive, the combination of a contact-wheel having a hub, and a friction-brake consisting of a bisected arm having jaws engaging the hub of said wheel, and means for pressing the jaws together to vary their frictional engagement therewith.

13. In an electric contact device for a locomotive, the combination of a contact-wheel having a hub, with a friction-brake consisting of a bisected arm formed with jaws embracing said hub, and provided with an adjusting-screw for drawing said jaws together to increase their frictional contact with the hub, and a spring interposed to transmit the pressure of said screw elastically to the jaws whereby to take up wear.

14. In an electric contact device for a locomotive, the combination of a contact-wheel formed with a hub, a mounting for supporting said wheel constructed to permit of its displacement, a friction-brake consisting of an arm having at one end frictional surfaces engaging said hub and arranged at its other end remote therefrom, and an arm pivoted to the latter end and connected to a relatively fixed part adapted to resist the tendency of the brake to revolve with the wheel while accommodating the movements thereof.

15. In an electric contact device for a locomotive, the combination of a contact-wheel constructed with hubs on opposite sides, a mounting for supporting said wheel adapted to permit of its vertical displacement, two brakes engaging said wheel consisting of arms constructed at one end to engage said hubs respectively and with their other ends extended remote therefrom, and a pivoted arm connected to said latter ends and adapted to resist the rotative tendency of the brake-arms while accommodating their up-and-down movements.

16. In an electric contact device for a locomotive, the combination of a contact-wheel formed with opposite hubs, a mounting for supporting said wheel, brake-arms on opposite sides of said wheel engaging its hubs and projecting upwardly therefrom, and an arm or lever to one end of which the upper ends of said brake-arms are pivoted, and which is pivoted to a relatively fixed part on an axis approximately parallel with the axis of the contact-wheel, whereby said lever serves to restrain and guide said brake-arms, and by its lateral stiffness to resist their lateral displacement.

17. In an electric contact device for a locomotive, the combination of contact-wheel C, a mounting therefor, brake-arms $d$ $d'$ frictionally engaging the opposite hubs of said wheel, and laterally-braced lever-arm J pivoted at one end on a relatively fixed axis $l^2$, and pivoted at the other end to the ends of said brake-arms, whereby it resists the rotative tendency thereof, accommodates their up-and-down movements, and serves to resist their lateral displacement.

18. The combination with a locomotive-circuit of a contact device consisting of a contact-wheel C, a mounting therefor, brake-arms $d$ $d'$ engaging opposite hubs on said wheel and projecting upwardly, the lever J to which their upper ends are pivoted, an insulation interposed between said pivoted ends and said lever, whereby the brake-arms are insulated from the lever and from each other, and the wires of said circuit connected to said brake-arms respectively.

19. In an electric contact device for a locomotive, the combination of a contact-wheel, a mounting therefor adapted to permit of its vertical displacement, an arm engaging said wheel and extending upwardly, a lever pivoted to said arm and to a relatively fixed axis, and a relatively fixed stop or abutment adapted to engage said lever and limit its downward movement, and thereby to determine the lowermost position of said contact-wheel.

20. In an electric contact device for a locomotive, the combination of a contact-wheel C, a mounting therefor adapted to permit of its vertical displacement, an arm connected to said wheel and extending upwardly, a lever J pivoted to said arm and to a relatively fixed axis, a base plate or frame, and an adjustable screw $G^2$ mounted in said base-plate and adapted to form an abutment for engaging the lever J and limiting its downward movement, whereby the lowermost position of said lever and of the contact-wheel may be varied by adjusting said screw.

21. The combination with a contact-wheel, of a mounting therefor consisting of a longitudinal spring carrying said wheel at its middle, two longitudinally-movable parts to which the opposite ends of said spring are attached, and base-frames to which said parts are connected, with stops for limiting their inward movements, whereby upon the displacement of the wheel the straightening of the spring will move one of the said parts in rearward direction.

22. The combination to form a contact device for a locomotive, of a contact-wheel C, a relatively fixed frame, and a mounting for said wheel consisting of longitudinal members S S, and pivoted hangers F F connecting the opposite ends of said longitudinal members to the fixed frame.

23. The combination with a contact-wheel of a mounting therefor consisting of longitudinal springs bowed downwardly and carrying said wheel at their middles, two pivoted hangers to the lower ends of which the opposite ends of said springs are connected, a relatively fixed frame to which the upper ends of said hangers are pivotally connected, and the hangers and frame formed with reciprocally-engaging stops to limit the inward swinging movement of the hangers, the whole being relatively arranged and proportioned so that the springs are distended between the lower ends of the hangers and thereby straightened, and the tension of the springs tending to bow them and thereby to lower the contact-wheel and draw the hangers together is resisted by said stops, whereby the springs are retained under tension and are adapted to strongly resist any upward displacement of the contact-wheel.

24. The combination with a contact-wheel of a mounting therefor consisting of longitudinal bowed springs and carrying said wheel at their middles, hangers to the lower ends of which the opposite ends of said springs are connected and between which the springs are distended and somewhat straightened, a relatively fixed frame to which said hangers are pivoted at their upper ends, and adjustable stops for limiting the inward swing of said hangers, whereby by the adjustment of said stops the springs may be more or less distended and the extent to which the contact-wheel projects may be thereby adjusted.

25. The combination with a locomotive of a frame carried thereby having stops or abutments $m\,m$, hangers F F pivoted to said frame at their upper ends, and provided with adjustable screw-stops $n\,n$ engaging said abutments, longitudinal downwardly-bowed springs S S connected at their opposite ends to said hangers, and a contact-wheel C supported by said springs at their middles.

26. The combination with the truck-frame of a locomotive, of frames or base-plates G G' fastened thereto and constructed with abutments $m\,m$, hangers F F pivoted to said frames and formed with stops engaging said abutments to limit their inward swing, longitudinal springs S S pivoted at their opposite ends to the lower ends of said hangers, and contact-wheel C carried by said springs at their middles.

27. In an electric contact device for a locomotive, the combination to form a contact-wheel, of disks $c\,c$, a tube or sleeve $i$ having flanges $i'$, movable flanges $e^2$ between which and the flanges $i'$ the disks are embraced, and bolts $k$ for drawing the flanges $e^2\,e^2$ toward each other and clamping the disks against the flanges $i'$.

28. The combination to form a contact-wheel of disks $c\,c$, a flanged sleeve or tube $i$, hubs $e\,e'$ fitting over said tube $i$ and having flanges between which and the flanges on the tube said disks are clamped, and means for forcing said hubs against the disks.

29. The combination to form a contact-wheel of disks $c\,c$, flanged tube or sleeve $i$, flanges $e^2\,e^2$, bolts $k\,k$ for drawing said flanges together, and locking-rings $k'\,k'$ engaging the heads and nuts of said bolts to prevent their turning.

30. The combination on a locomotive of an electric circuit, and an electric contact device consisting of a contact-wheel in connection with said circuit, a mounting therefor adapted to admit of the vertical displacement of the wheel, a closed contact-box, circuit-breaking contacts forming part of said circuit and inclosed within said box, and mechanical connections interposed between said contacts and wheel and adapted to separate said contacts and break the circuit upon the upward displacement of the contact-wheel.

31. The combination on a locomotive of an electric circuit, and an electric contact device consisting of a contact-wheel in connection with said circuit, a mounting therefor adapted to admit of the vertical displacement of the wheel, circuit-breaking contacts introduced in said circuit and having a normal tendency to separate and break the circuit, a stop adapted in the normal position of the contact-wheel to hold said contacts together and thereby maintain the circuit closed, and a connection with the contact-wheel adapted upon the upward displacement thereof to free said contacts from said stop and thereby cause the breaking of the circuit.

32. The combination upon a locomotive of an electric circuit, and a contact device consisting of a contact-wheel, a mounting therefor adapted to admit of its upward displacement, circuit-closing contact-terminals in connection with said circuit, normally out of contact, and mechanical connections between and the contact-wheel adapted to bring them into contact upon the upward displacement of said wheel.

33. The combination on a locomotive of an electric circuit, and an electric contact device consisting of a contact-wheel in connection with said circuit, a mounting therefor adapted to admit of the vertical displacement of the wheel, a contact-box, circuit breaking and closing contacts inclosed in said box and introduced in said circuit, a plunger movable within said box and controlling the relative positions of said contacts, and mechanical connections with said contact-wheel adapted to cause the movement of said plunger on the up-and-down displacement of said wheel.

34. The combination on a locomotive of an electric circuit, and an electric contact device consisting of a contact-wheel in connection with said circuit, a mounting therefor adapted to admit of the vertical displacement of the wheel, a contact-box, circuit breaking or closing contacts inclosed in said box and introduced in said circuit, a plunger movable within said box and controlling the relative positions of said contacts, a spring acting on said plunger tending to protrude it from said box, and mechanical connections with said contact-wheel adapted to press said plunger inwardly in the normal position of the wheel and release it upon the upward displacement of the wheel.

35. The combination on a locomotive of an electric circuit, and an electric contact device consisting of a contact-wheel in connection with said circuit, a mounting therefor adapted to admit of the vertical displacement of the wheel, a contact-box, circuit breaking or closing contacts inclosed in said box and introduced in said circuit, a plunger movable within said box and controlling the relative positions of said contacts, a spring acting on said plunger tending to protrude it from said box, a mechanical connection between said box and contact-wheel whereby the latter is moved bodily by the displacement of the wheel, and a stop against which said plunger rests in the normal position of the wheel, whereby the plunger is normally held pressed into the box.

36. The combination on a locomotive of an electric circuit, and a contact device consisting of a contact-wheel or part in connection therewith, a mounting therefor permitting of its upward displacement, circuit breaking or closing contact-terminals, a contact-box inclosing them, a flexible cable entering said box and comprising conducting-wires connected to said terminals, and insulated conductors passing out of said box and making electrical connection with said contact-wheel.

37. The combination on a locomotive of an electric circuit, and a contact device consisting of a contact wheel or part in connection therewith, a mounting therefor permitting of its upward displacement, circuit breaking or closing contact-terminals, a contact-box inclosing them, said box having a removable cover to which the contact-terminals are attached, a flexible cable entering the cover of said box and comprising conductors connected within the cover to said terminals, and a movable plunger in the body of said box adapted by its movements to determine the contact or separation of said terminals.

38. In a contact device, the combination of an inclosing box K, a spring-pressed plunger P therein, circuit closing and breaking springs engaged by said plunger, and a stop $G^2$, said plunger and stop being relatively movable, whereby by the consequent movements of the plunger relatively to said springs their contact or separation is effected.

39. The combination on a locomotive of a closed electric circuit, a contact device adapted to make contact with a contact-plate along the track, a normally open branch circuit, and a circuit-closer for said branch operated by the contact of said device with such plate.

40. The combination on a locomotive of a normally closed electric circuit, a contact device adapted to make contact with a contact-plate along the track, a normally open branch circuit, and a circuit breaker and closer operated by the displacement of said contact device, for breaking said closed circuit and closing said open circuit.

In witness whereof we have hereunto signed our names in the presence of two subscribing witnesses.

ELISHA B. CUTTEN.
    ARTHUR C. FRASER.

Witnesses:
 GEORGE H. FRASER,
 FRED WHITE.